(12) United States Patent
Ishida (10) Patent No.: US 6,665,475 B2
(45) Date of Patent: Dec. 16, 2003

(54) PRECISION FIBER OPTIC ALIGNMENT AND ATTACHMENT APPARATUS

(75) Inventor: Kenzo Ishida, San Jose, CA (US)

(73) Assignee: JDS Uniphase Corporation, San Jose, CA (US)

( * ) Notice: Subject to any disclaimer, the term of this patent is extended or adjusted under 35 U.S.C. 154(b) by 90 days.

(21) Appl. No.: 10/001,266

(22) Filed: Nov. 30, 2001

(65) Prior Publication Data

US 2003/0103729 A1 Jun. 5, 2003

(51) Int. Cl.[7] .............................. G02B 6/30; G02B 6/26
(52) U.S. Cl. .............................. 385/49; 385/50; 385/51; 385/52
(58) Field of Search .............................. 385/49, 50, 51, 385/52

(56) References Cited

U.S. PATENT DOCUMENTS

| | | | | |
|---|---|---|---|---|
| 4,772,086 A | * | 9/1988 | Bellerby et al. | ............... 385/89 |
| 5,327,517 A | * | 7/1994 | Yamada et al. | ............. 385/137 |
| 5,703,973 A | * | 12/1997 | Mettler et al. | ................. 385/14 |
| 6,160,937 A | * | 12/2000 | Fukuyama et al. | ........... 385/52 |
| 6,222,967 B1 | * | 4/2001 | Amano et al. | ................. 385/49 |
| 6,361,222 B1 | * | 3/2002 | Kawaguchi et al. | .......... 385/88 |
| 6,496,624 B1 | * | 12/2002 | Hikita et al. | ................... 385/50 |
| 6,526,204 B1 | * | 2/2003 | Sherrer et al. | ................. 385/49 |
| 6,571,040 B2 | * | 5/2003 | Paris | ........................... 385/50 |
| 2001/0028768 A1 | * | 10/2001 | Terashima | .................... 385/49 |
| 2003/0095776 A1 | * | 5/2003 | Saito et al. | .................. 385/137 |

* cited by examiner

*Primary Examiner*—John D. Lee
*Assistant Examiner*—Daniel Valencia
(74) *Attorney, Agent, or Firm*—Allen, Dyer, Doppelt, Milbrath & Gilchrist, P.A.

(57) ABSTRACT

A groove assembly for holding at least one fiber optic. The assembly includes a base, a cover and a small carrier disposed between the base and the cover. The carrier has at least one groove. At least one fiber optic is disposed in this groove and terminates at an edge surface of the carrier. The base and cover have respective edge surfaces serving as attachment surfaces for attachment of the assembly to a planar lightwave circuit (PLC). The PLC has at least one waveguide terminating at an edge, to which the fiber requires alignment. The base and/or cover are preferably formed from a material enabling attachment to the PLC, e.g., transparent to energy used for curing an adhesive. The carrier is formed from material enabling a substantially more precise formation of the grooves, e.g., silicon.

39 Claims, 6 Drawing Sheets fig. 1 fig. 2 fig. 3A    fig. 3B fig. 3C fig. 3D fig. 4A  fig. 4B fig. 4C fig. 4D fig. 5A    fig. 5B fig. 5C fig. 5D fig. 6

PRECISION FIBER OPTIC ALIGNMENT AND ATTACHMENT APPARATUS

FIELD OF THE INVENTION

The present invention relates to fiber optics. More particularly, the present invention relates to a technique for precise alignment and attachment of fiber optics to planar lightwave circuits (PLCs).

BACKGROUND OF THE INVENTION

Fiber optic communication links employ in-line, optical components for various operations including amplification, attenuation, multiplexing, demultiplexing, etc. These components are often formed from planar lightwave circuits (PLCs), within which various structures are used to perform the requisite optical signal processing operations.

PLCs are usually wafer-based modules formed using various silicon-based semiconductor formation techniques including growth, deposition and etching. The upper layers of PLCs usually employ waveguides (e.g., silica-on-silicon), deposited and etched, through which the optical signals are transmitted. For effective use in fiber optic systems, the PLC waveguides must be interfaced to fiber optics, which carry the optical signals to and from the PLC.

To ensure quality signal transmission to and from the PLC, the fiber optics must be precisely aligned to the PLC waveguides. Any misalignment will result in signal insertion loss, which is highly undesirable in optical networks because it directly impacts the distance over which the optical signals can travel. Equally important are the techniques used to attach the fiber optics to the PLC. Rigid attachment is required to maintain alignment over the life of the component, and through various environmental conditions. The techniques chosen for alignment and attachment are highly interrelated since they will be implemented on the same sub-assembly, and thus must be carefully, and compatibly implemented, while keeping the costs of the sub-assembly to acceptable levels.

What is required, therefore, are improved techniques for aligning and attaching fiber optics to PLC waveguides, which are compatible and which can be implemented at reasonable costs.

SUMMARY OF THE INVENTION

These requirements are met, and further advantages are provided, by the present invention which in one aspect is a groove assembly for holding at least one fiber optic, and methods for its fabrication and use. The assembly includes a base, a cover and a carrier disposed between the base and the cover. The carrier has at least one groove. At least one fiber optic is disposed in this groove, and therefore between the carrier and the base or cover, and terminates at an edge surface of the carrier. The base and cover have respective edge surfaces serving as attachment surfaces for attachment of the groove assembly to a device with at least one waveguide terminating at an edge thereof, to which the fiber (or array of fibers) is to be aligned.

The base and/or cover are preferably formed from a first material enabling attachment of the assembly to the device, e.g., a material transparent to energy to be directed through the material for curing an adhesive used to adhere the respective edge surfaces of the base and cover to the device. The carrier is formed from a second material enabling a substantially more precise formation of the grooves than would the first material, e.g., silicon, which enables precise formation of the grooves.

The assembly is especially adapted for attachment to the edge of a planar lightwave circuit (PLC). The PLC has at least one waveguide running to the edge thereof, and the assembly is attached via the respective edge surfaces of the base and cover, and respective mating surfaces of the PLC, using an adhesive, such that the fiber optic is aligned to the waveguide. The PLC may also include a block, to form one of the mating surfaces. This block may also be formed from a material transparent to energy to be directed through the material for curing the adhesive.

The combination of the small silicon carrier, between the transparent base and cover, offers distinct advantages over prior techniques. High precision groove formation is possible in the silicon, thus improving optical performance. The small piece of silicon (5 mm vs. 12 mm) decreases costs. Finally, larger, transparent base and cover pieces provide at least two adhesion points and other structural integrity.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may be best understood by reference to the following detailed description of the preferred embodiment(s) and the accompanying drawings in which:

BEST MODE FOR CARRYING OUT THE INVENTION

Figure 1:
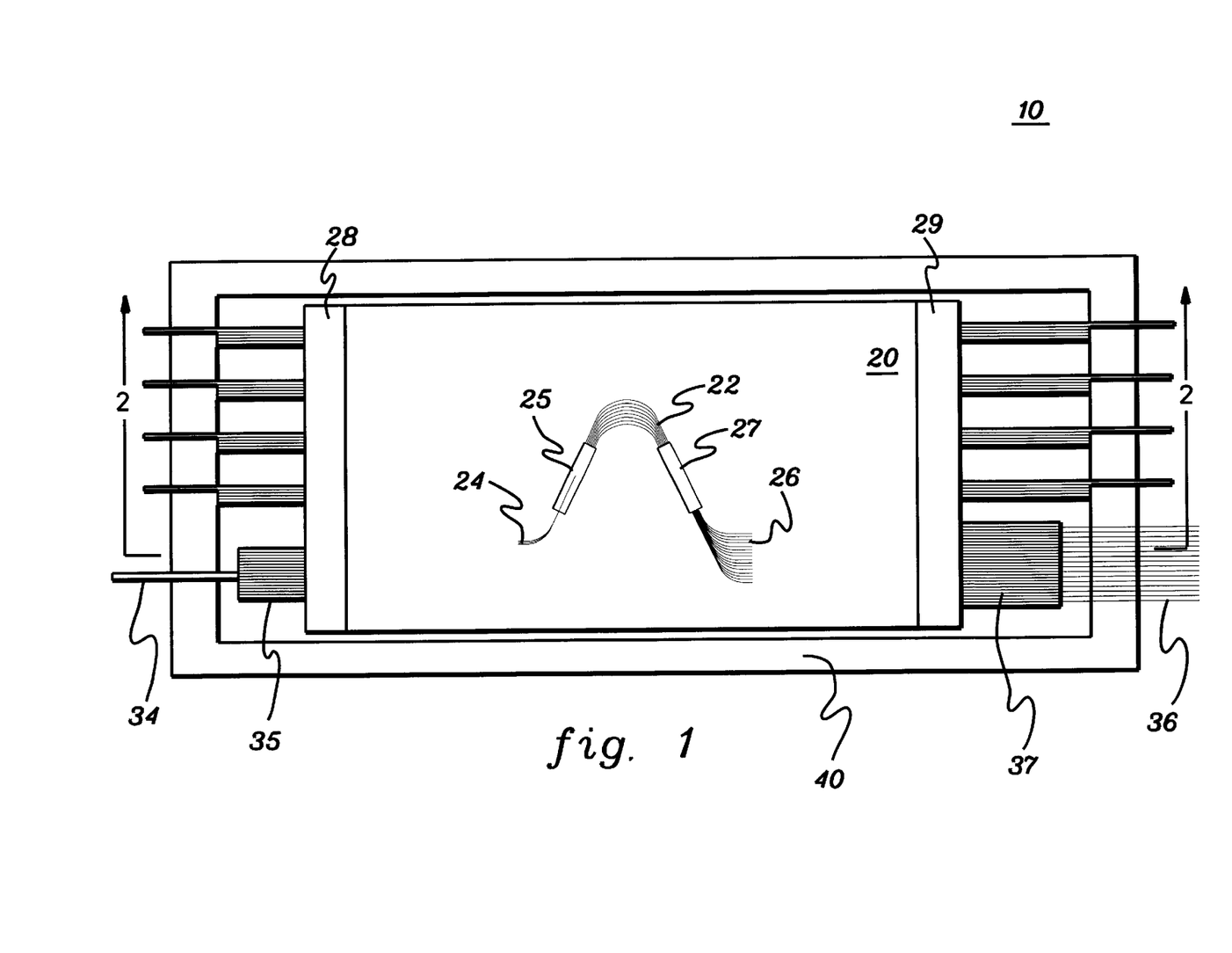
FIG. 1 depicts a partially packaged planar lightwave circuit (PLC) in the form of an arrayed waveguide grating (AWG) having input and output fiber assemblies.

With reference to FIG. 1, an exemplary planar lightwave circuit (PLC) package 10 is shown having an arrayed waveguide grating (AWG) on a PLC substrate 20 (e.g., silicon) in a package base 40. As known to those in the art, an AWG employs an array of waveguides 22 having carefully controlled, differing path lengths which cause constructive phase interference patterns on the optical signals transmitted therein. This technique is useful for multiplexing or demultiplexing optical signals passed from the array input/focusing region 24/25 to the array output/focusing region 26/27. These waveguides run to the opposing edges of the substrate 20, and interface with fiber optics 34/36 via assemblies 35 and 37, respectively. As discussed in detail below, glass blocks 28 and 29 along the PLC edges facilitate attachment at this interface.

In the exemplary demultiplexing application shown, input fiber optic 34 is interfaced to substrate 20 using a glass or silicon v-groove block assembly 35. Multiple output fibers 36 are also interfaced to the substrate 20 using a similar block assembly 37.

Figure 2:
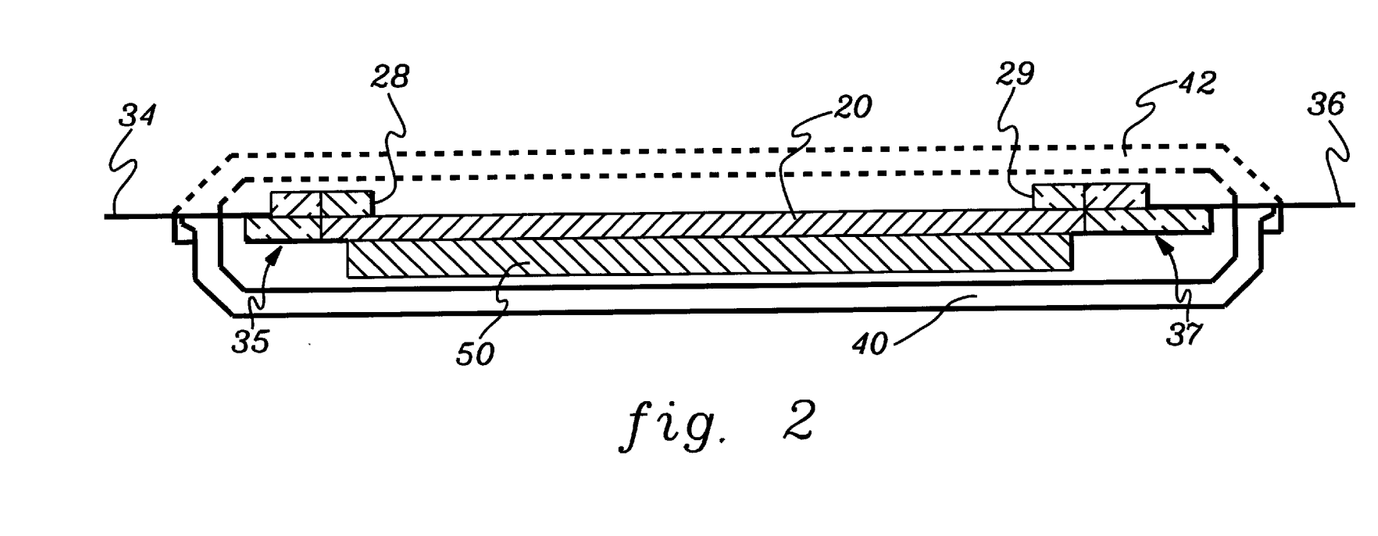
FIG. 2 is a side, cross-sectional view of the PLC package of FIG. 1.

With reference now to the side, cross-sectional view of FIG. 2, a planar heating element or heater 50 is now visible under substrate 20. The heater is used to ensure that substrate 20 is maintained at a constant temperature (very uniformly across its surface), since temperature changes will cause minor structural changes in AWG signal paths, and negatively impact its optical performance. Substrate 20 is mounted onto heater 50 using, for example, a low modulus silicon material. Package lid 42 is shown in dashed lines.

Side views of the v-groove fiber assemblies 35 and 37 are also apparent here. These assemblies are usually assembled before their attachment to the PLC, and their insertion into the package. Their main function is the interface between the fiber optics 34/36, and optical waveguides running to the edges of PLC 20.

Figures 3A, 3B:
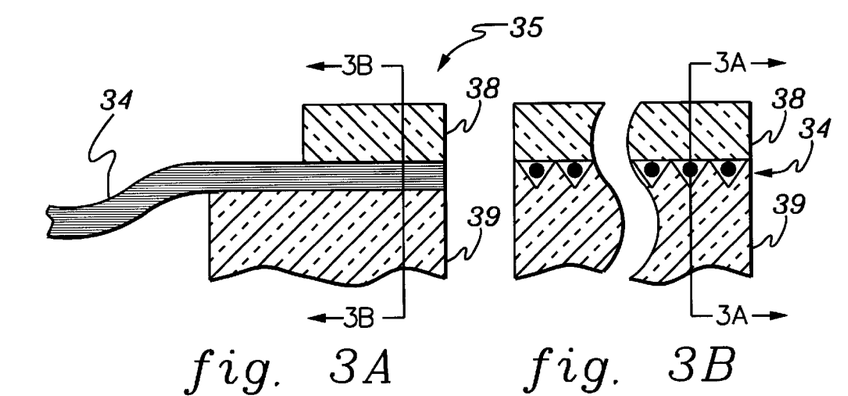
FIGS. 3a–b are cross-sectional views (side and end) of a first "glass" embodiment of an input or output fiber assembly.

One embodiment of exemplary groove assembly 35 is depicted in greater detail in the cross-sectional views of FIGS. 3a–b. Base 39 is shown into which v-grooves are formed, for holding the fibers 34. In this embodiment, glass (e.g., pyrex or quartz) is used as base 39. Once the v-grooves are formed, and the fibers are place into the grooves, a glass cover 38 (e.g., pyrex or quartz) is placed over the grooves to rigidly hold the fibers in place. The edge face of this completed assembly is then polished in its entirety to ensure a planar surface (including clean fiber edge faces) for attachment to the PLC.

Figure 3C:
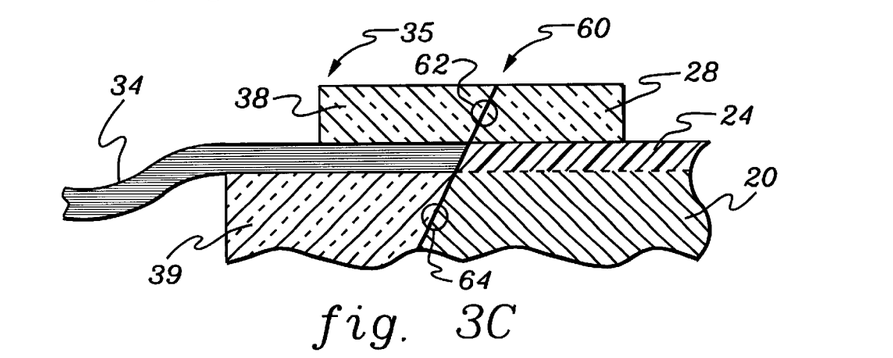
FIGS. 3c–d are side, cross-sectional views of the first embodiment attached to a PLC.

A similar side, cross-sectional view is shown in FIG. 3c, now with assembly 35 attached to PLC 20, along their interface 60. Attachment points 62 and 64 are shown, where an ultraviolet (UV) curable adhesive may be used to adhere the two assemblies. A glass block 28 is shown affixed to the edge of PLC 20, to provide structural integrity along this edge, as well as an additional surface area for attachment point 62. This combined edge is also polished. When attaching assembly 35 to PLC 20, active techniques may be used to ensure alignment between the PLC waveguides 24 running to this edge, and the fibers 34, now in assembly 35. Also, the mating surfaces are shown polished at an angle to minimize unwanted reflections (here exaggerated, but nominally +/−8 degrees in practice).

Figure 3D:
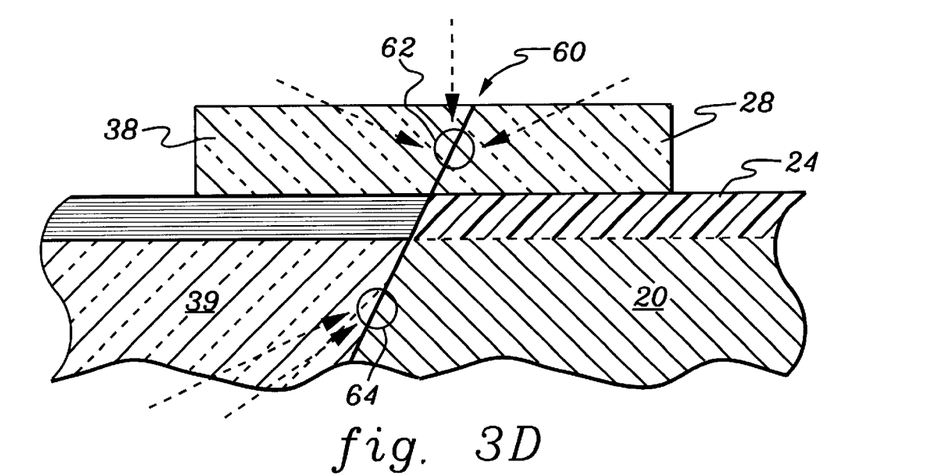

Some performance considerations are evident when choosing these attachment and alignment techniques. First, to ensure fiber placement accuracy in the grooves of base 39, these grooves should be formed precisely. In this exemplary glass embodiment, the grooves are usually machined into the upper surface of the base, to an accuracy of about +/−0.05 µm (micrometer) groove pitch tolerance. This may not be optimal tolerance, but the glass base does provide other notable advantages: it is strong yet transparent, thus allowing UV light energy transmission to attachment point 64 (represented as the dashed lines in the enlarged view of FIG. 3d) thus improving adhesion. Two main adhesion points 62 and 64 are accessible by UV light energy transmitted through transparent materials, in this embodiment. Also, glass is much less expensive than other alternative materials.

Another similar embodiment is shown in FIGS. 4a–d. The architecture of assembly 135 is similar to that of assembly 35 discussed above, however silicon is used as base 139 (rather than glass), but a glass cover 138 is still employed. Fibers 134 run through grooves formed into the upper surface of base 139. All elements 28, 24 and 20 of PLC remain the same.

Figure 4A:
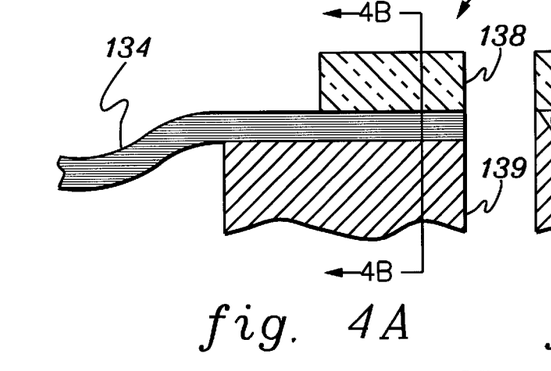
FIGS. 4a–b are cross-sectional views (side and end) of a second "silicon" embodiment of an input or output fiber assembly.
Figure 4B:
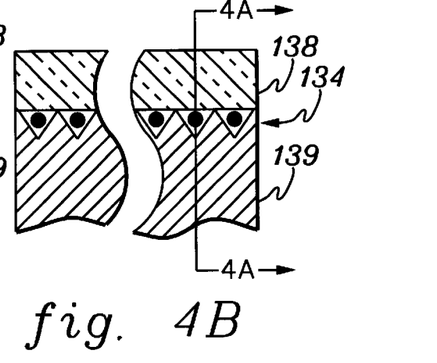
Figure 4C:
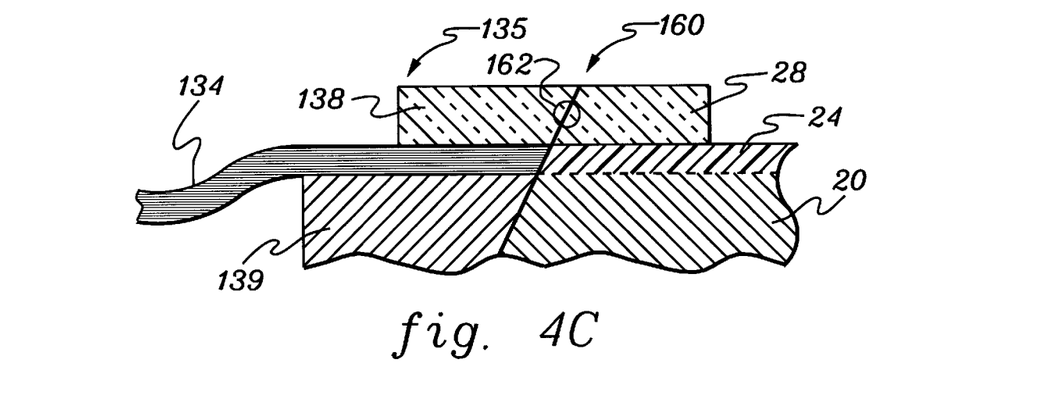
FIGS. 4c–d are side, cross-sectional views of the second embodiment attached to a PLC.
Figure 4D:
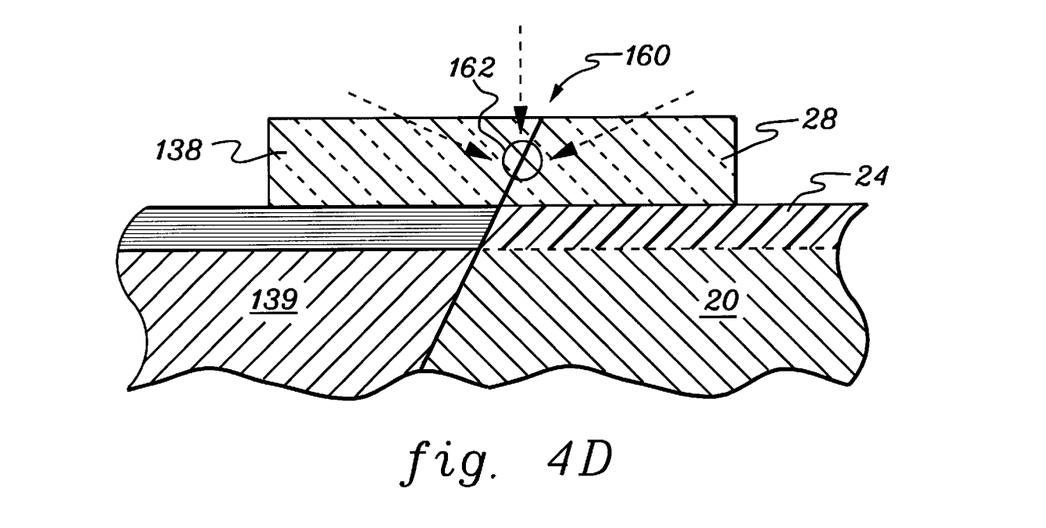

By using silicon as the base material, much more precise groove formation is possible than with glass, e.g., +/−0.025 µm groove pitch tolerance, thus the fibers are aligned and coupled to the PLC waveguides with much greater accuracy. The groove formation can be done with known silicon processing techniques, including deposition, masking, etching, etc. However, this amount of silicon (e.g., more than 12 mm in the lateral direction shown) leads to more expense, though somewhat offset by the improved processing costs and yields over glass v-groove machining (especially at high volumes). Also (as shown in FIG. 4d) the lower attachment point is lost because silicon is not transparent to UV light, and most attachment is effected at attachment point 162 of interface 160. This results in the need for much greater process control during attachment, and may lead to adverse long-term reliability concerns.

Figure 5A:
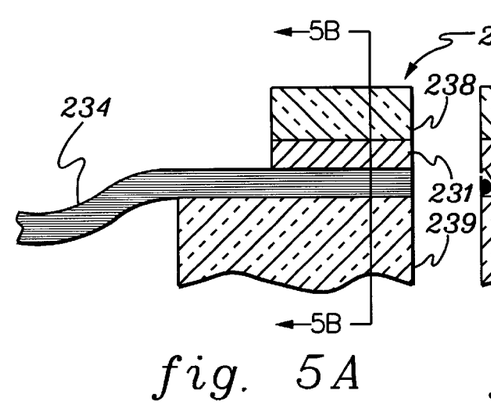
FIGS. 5a–b are cross-sectional views (side and end) of an input or output fiber assembly, mixed glass and silicon, in accordance with an aspect of the present invention.
Figure 5B:
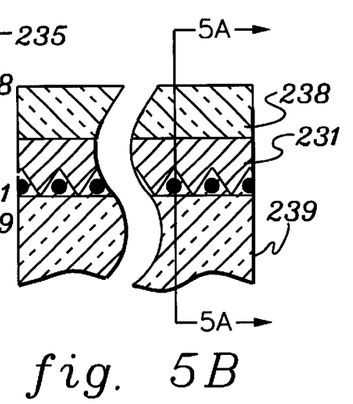
Figure 5C:
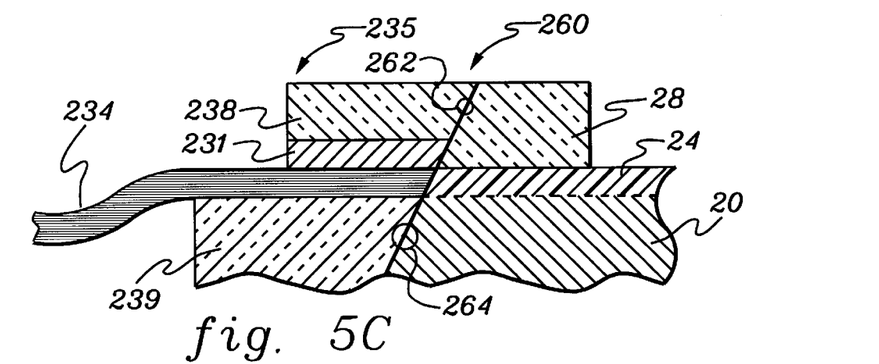
FIGS. 5c–d are side, cross-sectional views of this assembly attached to a PLC.

In accordance with the present invention, and with reference to the side cross-sectional views of FIGS. 5a–b, groove assembly 235 includes a small, thin "carrier" 231 disposed (e.g., using epoxy or other suitable connection technique) between cover 239 and base 238. Carrier 231 is formed from a material like silicon, which enables a substantially more precise formation of grooves therein, than would the base or cover materials (here e.g., glass—pyrex or quartz). Fibers are held in their (here inverted) grooves, between the cover 239 and the carrier 231. (Note that the terms "base" and "cover" are used broadly and for convenience herein to connote any type of structures necessary for the structural and/or performance integrity of the assemblies disclosed herein. They may be in opposite positions, or may not actually function as the terms "base" or "cover" may literally imply.) All elements 28, 24 and 20 of PLC remain the same.

This carrier is, for example, about 750 µm thick, and about 5 mm along its lateral dimension (i.e., much smaller than the 12 mm silicon base of FIGS. 4a–d). Thus the groove formation precision is retained in this embodiment, but at a more than 50% reduction in the usage of silicon. (It should be noted that both silicon embodiments are cheaper than the machined glass embodiment of FIGS. 3a–d, because of processing issues.)

Figure 5D:
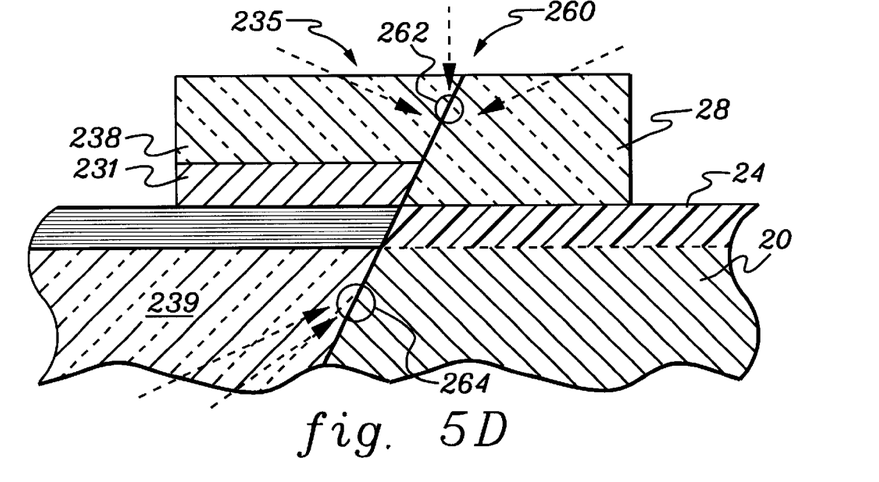

Because the carrier is disposed between the transparent base and cover, two attachment points 262 and 264 are provided along interface 260. As shown in FIG. 5d, these attachment points are both easily accessed by UV light energy through their surrounding structures, thus increasing the effectiveness and resilience of the attachment of assembly 235 to PLC 20.

The invention is applicable to single input or output fibers, or large fiber arrays. The term "groove" is used broadly herein to connote any type of cavity structure within carrier 231 suitable for holding a longitudinal fiber optic, and includes (without limitation) v-grooves, u-grooves, rectangular grooves, through-tubes, or any similar structures.

Figure 6:
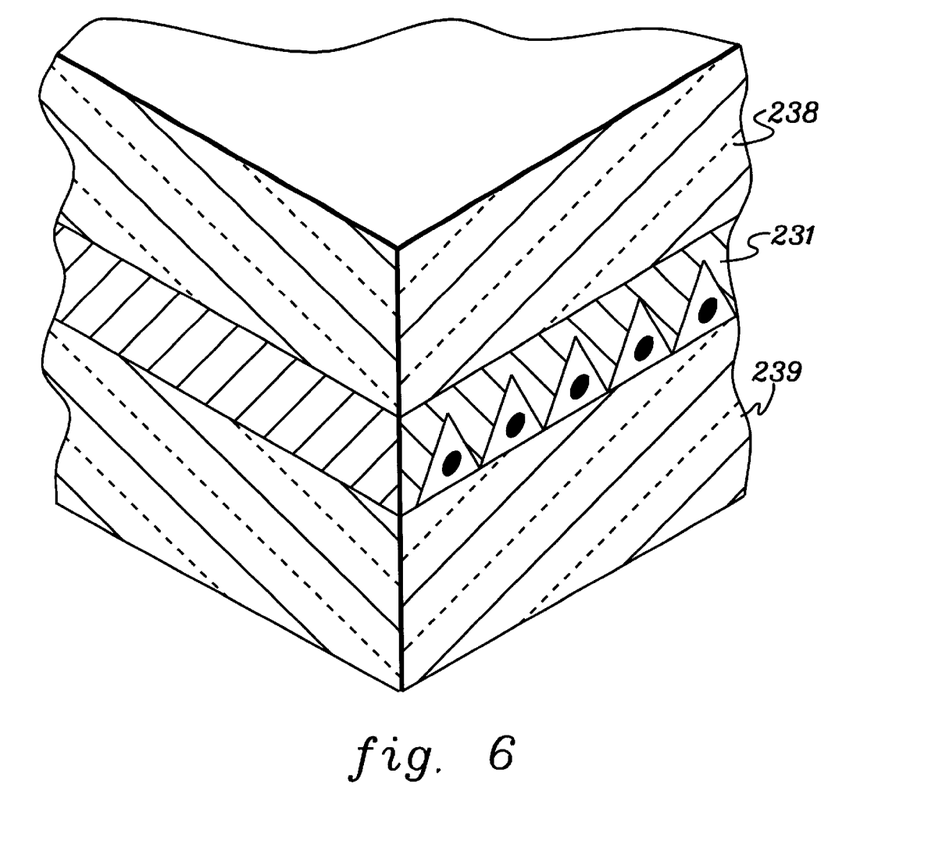
FIG. 6 depicts, enlarged, the attachment face of a fiber assembly in accordance with an aspect of the present invention.

Additional detail of one embodiment of the inventive assembly is shown in the perspective view of FIG. 6. Here, the combined, polished edge comprised of base 238, carrier 231, fiber array faces, and cover 239 are shown. Particular advantages directly flow from this architecture: High precision groove formation in a material like silicon, thus improving optical performance; small piece of silicon (5 mm vs. 12 mm) thus decreasing costs; maintenance of at least two adhesion points and other structural integrity provided by the two larger transparent pieces surrounding the carrier.

While the invention has been particularly shown and described with reference to preferred embodiment(s) thereof, it will be understood by those skilled in the art that various changes in form and details may be made therein without departing from the spirit and scope of the invention.

What is claimed is:

1. An assembly for coupling at least one fiber optic to an optical device, comprising:
   a base;
   a cover;
   a carrier disposed between the base and the cover, having at least one groove formed therein;
   at least one fiber optic disposed in a respective groove of the at least one groove, and therefore between the carrier and the base or cover, and terminating at an edge surface of the carrier; and
   a planar lightwave circuit (PLC) having at least one waveguide running to an edge thereof;
   wherein mating surfaces of the PLC are attached to edge surfaces of the base and cover above and below the carrier, such that the at least one fiber optic is aligned to the at least one waveguide.

2. The assembly of claim 1, wherein the base and/or cover are formed from a first material, and the carrier is formed from a second material enabling a substantially more precise formation of the at least one groove than would the first material.

3. The assembly of claim 2, wherein the second material comprises silicon to enable precise formation of the at least one groove.

4. The assembly of claim 2, wherein the first material comprises a material transparent to energy to be directed therethrough for curing an adhesive used to adhere the respective edge surfaces of the base and cover to the PLC.

5. The assembly of claim 4, wherein the base and cover are formed from the first material.

6. The assembly of claim 5, wherein the second material comprises silicon to enable precise formation of the at least one groove.

7. The assembly of claim 1, wherein the PLC comprises a block mounted thereon, the block including one of the mating surfaces.

8. The assembly of claim 7, wherein the block is formed from a material transparent to energy to be directed therethrough for curing an adhesive used to adhere the edge surface of the cover to the block.

9. The assembly of claim 1, wherein the at least one fiber optic comprises an array of fiber optics, and the at least one groove comprises an array of grooves into which the array of fiber optics is disposed.

10. A method for fabricating an assembly for coupling at least one fiber optic to an optical device, comprising:
    providing a base and a cover;
    disposing a carrier between the base and the cover, the carrier having at least one groove formed therein;
    disposing at least one fiber optic in a respective groove of the at least one groove, and therefore between the carrier and the base or cover, and terminating at an edge surface of the carrier; and
    attaching mating surfaces of a planar lightwave circuit (PLC) to edge surfaces of the base and the cover above and below the carrier, wherein the PLC has at least one waveguide running to the edge thereof that is aligned with one fiber optic.

11. The method of claim 10, wherein the base and/or cover are formed from a first material, and the carrier is formed from a second material enabling a substantially more precise formation of the at least one groove than would the first material.

12. The method of claim 11, wherein the second material comprises silicon to enable precise formation of the at least one groove.

13. The method of claim 11, wherein the first material comprises a material transparent to energy to be directed therethrough for curing an adhesive used to adhere the respective edge surfaces of the base and cover to the PLC.

14. The method of claim 13, wherein the base and cover are formed from the first material.

15. The method of claim 14, wherein the second material comprises silicon to enable precise formation of the at least one groove.

16. The method of claim 15, wherein said attaching includes:
    illuminating the respective edge surfaces of the base and cover and the respective mating surfaces of the PLC with energy, through the base and the cover, to cure said adhesive.

17. The method of claim 16, wherein the PLC comprises a block mounted thereon, the block including one of the mating surfaces.

18. The method of claim 17, wherein the block is formed from a material transparent to energy to be directed therethrough for curing the adhesive.

19. The method of claim 18, wherein said attaching includes:
    illuminating one of the respective edge surfaces of the base and cover with energy, through the block, to cure said adhesive.

20. The method of claim 10, wherein said attaching includes:
    illuminating the respective edge surfaces of the base and cover and the respective mating surfaces of the PLC with energy, through the base and the cover, to cure an adhesive used to adhere the respective edge surfaces of the base and cover to the PLC.

21. The method of claim 10, wherein the PLC comprises a block mounted thereon, the block including one of the mating surfaces.

22. The method of claim 21, wherein said attaching includes:
    illuminating one of the respective edge surfaces of the base and cover with energy, through the block, to cure an adhesive used to adhere the edge surface of the cover to the PLC.

23. The method of claim 10, wherein the at least one fiber optic comprises an array of fiber optics, and the at least one groove comprises an array of grooves into which the array of fiber optics is disposed.

24. A method for holding at least one fiber optic, for attachment to a device having at least one waveguide terminating at an edge thereof, and to which the at least one fiber is to be aligned, comprising:
    using a groove assembly, including a base and a cover, and a carrier between the base and the cover, the carrier having at least one groove formed therein;
    disposing at least one fiber optic in a respective groove of the at least one groove, and therefore between the carrier and the base or cover, and terminating at an edge surface of the carrier;

aligning a fiber optic in the groove assembly to a waveguide in said device; and attaching the device and the assembly via edge surfaces of the base and the cover, and respective mating surfaces of the PLC above and below the carrier.

25. The method of claim 24, wherein the base and/or cover are formed from a first material enabling attachment of the assembly to the device, and the carrier is formed from a second material enabling a substantially more precise formation of the at least one groove than would the first material.

26. The method of claim 25, wherein the second material comprises silicon to enable precise formation of the at least one groove.

27. The method of claim 25, wherein the first material comprises a material transparent to energy to be directed therethrough for curing an adhesive used to adhere the respective edge surfaces of the base and cover to the device.

28. The method of claim 27, wherein the base and cover are formed from the first material.

29. The method of claim 28, wherein the second material comprises silicon to enable precise formation of the at least one groove.

30. The method of claim 29, wherein the device comprises a planar lightwave circuit (PLC).

31. The method of claim 30, wherein said attaching includes:

illuminating the respective edge surfaces of the base and cover and the respective mating surfaces of the PLC with energy, through the base and the cover, to cure said adhesive.

32. The method of claim 31, wherein the PLC comprises a block mounted thereon, said block comprising one of the mating surfaces.

33. The method of claim 32, wherein the block is formed from a material transparent to energy to be directed through the material for curing the adhesive.

34. The method of claim 33, wherein said attaching includes:

illuminating one of the respective edge surfaces of the base and cover with energy, through the block, to cure said adhesive.

35. The method of claim 24, wherein the device comprises a planar lightwave circuit (PLC).

36. The method of claim 35, wherein said attaching includes:

illuminating the respective edge surfaces of the base and cover and the respective mating surfaces of the PLC with energy, through the base and the cover, to cure an adhesive.

37. The method of claim 36, wherein the PLC comprises a block mounted thereon, the block comprising one of the mating surfaces.

38. The method of claim 37, wherein said attaching includes:

illuminating one of the respective edge surfaces of the base and cover with energy, through the block, to cure said adhesive.

39. The method of claim 24, wherein the at least one fiber optic comprises an array of fiber optics, and the at least one groove comprises an array of grooves into which the array of fiber optics is disposed.

* * * * *